United States Patent [19]

Wood

[11] 4,347,686
[45] Sep. 7, 1982

[54] FIN-STABILIZED CONTAINER OF FOLDABLE SHEET MATERIAL

[75] Inventor: Arthur D. Wood, Ottawa, Canada

[73] Assignee: Canadian Patents & Development Limited, Ottawa, Canada

[21] Appl. No.: 919,798

[22] Filed: Jun. 28, 1978

[51] Int. Cl.³ .............................................. A01G 23/02
[52] U.S. Cl. ...................................... 47/73; 206/423; 220/DIG. 30; 229/8
[58] Field of Search ..................... 229/8; 244/1; 47/73, 47/74, 75, 76, 77, 78, 84; 46/11; 273/106.5, 106.5 B, 106.5 C; 206/423; 220/DIG. 30

[56] References Cited

U.S. PATENT DOCUMENTS

| 943,389 | 12/1909 | Cockrell | 229/8 |
| 1,009,640 | 11/1911 | Borges | 273/106.5 R |
| 1,988,691 | 1/1935 | Lovett | 47/73 |
| 2,592,052 | 4/1952 | McKenna | 111/1 X |
| 3,273,284 | 9/1966 | Anagnostou | 47/74 |
| 3,668,796 | 6/1972 | Patterson | 229/8 |
| 3,755,962 | 9/1973 | Walters et al. | 111/1 X |
| 3,852,913 | 12/1974 | Clendinning et al. | 47/74 |

FOREIGN PATENT DOCUMENTS

| 957207 | 11/1974 | Canada | 47/74 |
| 1334426 | 7/1963 | France | 229/8 |

Primary Examiner—James R. Feyrer
Attorney, Agent, or Firm—Ronald G. Bitner

[57] ABSTRACT

A fin-stabilized container formed from foldable sheet material, particularly suited for aerial planting of seeds or seedlings. A cone or pyramid of sheet material is folded so as to form three or more fins at the trailing end and closure means for a container cavity at the forward end.

8 Claims, 5 Drawing Figures

FIN-STABILIZED CONTAINER OF FOLDABLE SHEET MATERIAL

BACKGROUND OF THE INVENTION

This invention relates to a fin-stabilized container formed from foldable sheet material, and particularly to fin-stabilized containers for aerial planting.

For aerial planting, and particularly for reforestation purposes, there is a need for a low-cost container which can enclose a seed or seedling and some growth medium, and be dispensed in large numbers from an aircraft. The trajectories of such containers must be reasonably predictable and their velocity at impact must be sufficient to provide the required ground penetration for subsequent growth of the seed or seedling.

U.S. Pat. No. 3,755,962, issued on Sept. 4, 1973 to J. Walters and I. S. Gartshore discloses a fin-stabilized container for the aerial planting of seeds or seedlings. The container disclosed, however, does not incorporate all of the features desirable for the successful aerial planting of seeds or seedlings. In particular, no method of closure to prevent loss of the contents of the container prior to ground penetration is described. Furthermore, the container disclosed has no provision for ballast to ensure a centre of gravity position far enough forward for stability and to achieve adequate kinetic energy during descent for penetration on impact. These features may not be readily incorporated in a container made of rigid, moldable material without significantly increasing the ultimate cost per seed or seedling planted.

SUMMARY OF THE INVENTION

It has been found that a fin-stabilized container can be made at low cost from foldable sheet material.

The present invention provides a fin stabilized container made from foldable sheet material in the shape of a hollow cone or pyramid, having an apex defining the forward end, and an opposite trailing end, said trailing end being folded inwardly toward a central longitudinal axis of the cone or pyramid at three or more circumferentially spaced regions to form fins projecting outwardly from the central longitudinal axis, and to provide closure means for the container.

DESCRIPTION OF PREFERRED EMBODIMENTS

Figure 1:
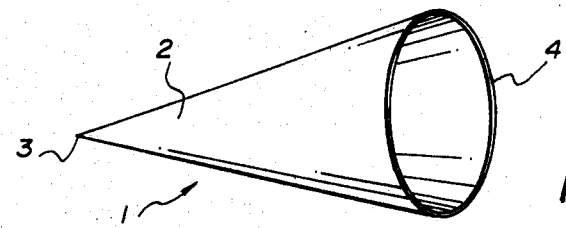
FIG. 1 illustrates a cone of sheet material from which a fin-stabilized container of the present invention is formed.

FIG. 1 illustrates a cone 1 of sheet material from which the fin-stabilized container of the present invention is formed. The cone 1 has a forward end 2 including an apex 3, and a trailing end 4.

Figure 2:
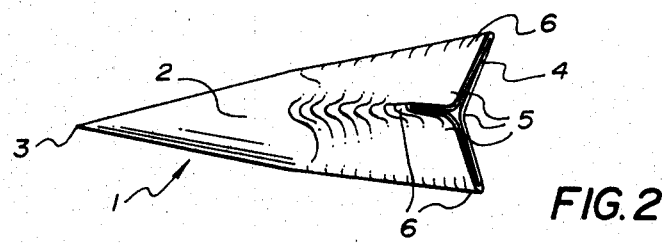
FIGS. 2 and 3 illustrate embodiments of fin-stabilized containers formed from the cone of FIG. 1.

FIG. 2 shows the cone 1 of FIG. 1 after folding. The trailing end 4 has been folded inwardly toward the central longitudinal axis of the cone at three circumferentially spaced regions 5 to form three fins 6 that project outwardly from the central longitudinal axis. The forward portion 2 retains a conical configuration and defines a container cavity. The folded trailing end 4 also serves to close, at least partially, the rearward end of the container cavity.

For the purpose of aerial planting, a seed or seedling together with a growth medium is placed in the forward cavity defining portion 2 of the open cone as illustrated in FIG. 1. To facilitate ground penetration and increase stability, some high density material may also be placed at the forward portion of the cavity. The folding operation forms the fins 6 and at the same time provides the closure means for the rearward end of the container cavity. For planting seedlings, a portion of the seedling may protrude rearwardly from the container through an opening provided at the central longitudinal axis by the folding operation.

Figure 3:
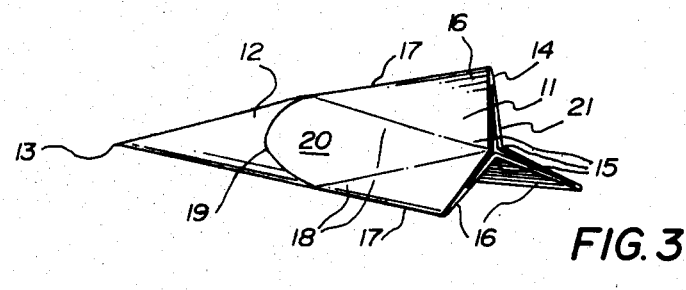

FIG. 3 shows a fin-stabilized container formed from a cone-shaped blank, as in FIG. 1, having fold lines 17 and 18 which delineate the fins 16 and the junction between the fins 16 and the container portion 12. Each fin is delineated by an outer fold line 17, defining the outer edge of the fin 16, two inner fold lines 18, defining the inner edge, and the trailing edge 14. The inner fold lines 18 also define the junction between the fin 16 and container portion 12. The line 19 defines the transition from the conical shape of the container portion 12 to the flat portions 20. The flat portions 20 define the rearward end or closure of the container cavity. The fold lines 17 and 18 allow two adjacent surface portions 11 and 21 to be placed contiguous with one another to form a unitary fin 16. As in the embodiment of FIG. 2, the fin-stabilized container is formed by folding the trailing end 14 inwardly toward the central longitudinal axis at three points 15.

Figure 4:
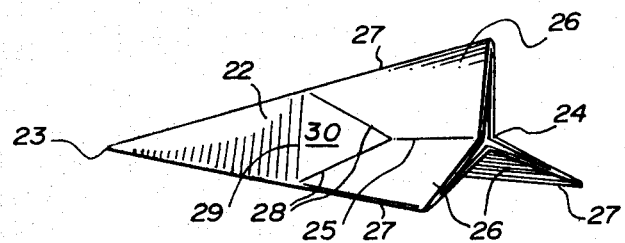
FIGS. 4 and 5 illustrate alternate embodiments of the invention.

FIG. 4 shows another embodiment of a fin-stabilized container formed from a pyramid-shaped blank having three sides. The container is provided with three outer fold lines 27 which extend from the apex 23 to the trailing end 24. Disposed between and interconnected with, the outer fold lines are inner fold lines comprising three longitudinal portions 25 extending along or near the central longitudinal axis of the pyramid and six oblique portions 28, and three transverse fold lines 29. The fold lines 27, 28, 25, and the rearward edge 24 delineate flat surface portions of the fins 26, and the fold lines 28 define the junction between the fins 26 and the container cavity defining portion 22. The fold lines 28 and 29 delineate flat portions 30 which define a pyramid shaped rearward end or closure for the container portion 22.

FIG. 2 shows a fin-stabilized container having four fins 36 formed by folding the trailing end 34 inwards at four points 35 near the four inner fold lines 37. The inner fold lines 37 as shown do not intersect at the trailing end 34. This provides an opening 38 at the trailing end 34 which may be used to allow a seedling 39 to protrude from the container. The container portion 32 has twelve fold lines 40 to form a twelve sided pyramid that is truncated at 41. The fold lines 40 as shown extend only partially towards the truncated end 41 which is circular in cross-section.

Disposed at the forward end of the container portion 32 is a conical shaped ballast element 42, which is inserted prior to folding the trailing end 34. The ballast element 42 as shown is solid with a conical rearward end 43 to deflect the growing roots outward. In addition to providing ballast to increase stability and ensure adequate kinetic energy for earth penetration, the element 42 may serve as an earth penetrating nose to protect the relatively fragile container upon impact with the ground. In addition, or alternately, a nose cap 44 may be placed over the forward end of the container. The nose cap 44 and the ballast element 42 may be used in combination to clamp the sheet material of the container, forming an integrated assembly.

It will be noted that as the number of sides for a pyramid shaped container portion is increased, it approaches a conical shape. As the number of sides is increased, the volume of the container is increased.

It will be understood that a flat sheet of material may be used to form the cone or pyramid from which the fin-stabilized container is formed, or that a pyramid may be formed from a cone. Alternately, a cone or pyramid may be folded directly. Also, the cone or pyramid may be folded with the use of a suitable mechanical folding apparatus, with or without the use of scored fold lines.

In order for the folded container to retain its shape and provide an adequate closure for the contents, it may be necessary to secure the trailing end of the container in the folded closed position, for example, by securing each adjacent pair of flat portions which form a fin to one another. The use of a water-soluble adhesive facilitates the egress of the seedling after planting upon exposure to moisture.

For the purpose of aerial planting, the container may be made from a variety of materials. Biodegradable materials may be preferable, for example, suitably constituted paper. A protective nose cap, if fitted, may ensure ground penetration irrespective of the strength of the material used for the container. However, partial breaking up of the container, for example, by splitting along scored fold lines, may be desirable to facilitate root and plant egress and development. If required, small apertures or perforations may be provided to facilitate egress. Loss of growth medium prior to ground penetration may then be prevented, for example, by using apertures or perforations smaller than the granules of the growth medium or by the use of a water-soluble coating applied to the surface of the container material after perforation.

Figure 5:
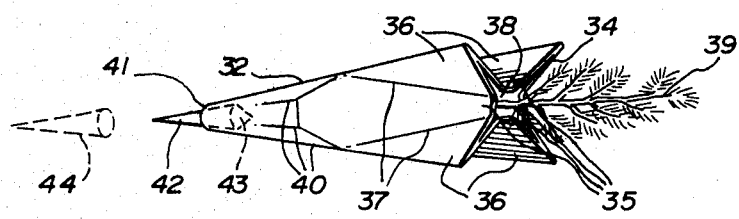

The ballast material need not be in the form of a unitary solid element as illustrated in FIG. 5, but may be in granular or powder form.

Seed or seedling planting containers made in accordance with the present invention would be dispensed from the aircraft at the rate required to achieve the desired spacing on the ground by means of suitable mechanical apparatus installed on the aircraft.

It will be understood that the fin-stabilized container of the present invention need not be limited to the planting of seeds or seedlings. The present invention may be applied to other uses requiring a container cavity with fins for stabilization. Construction from flat sheet material folded in accordance with the present invention can offer significant reductions in cost.

I claim:

1. A fin-stabilized container formed from a unitary tapered container made from foldable sheet material, said tapered container having an apex defining the forward end and an opposite trailing end, at least three fold lines extending longitudinally from the trailing end at least partially towards the apex, said trailing end being folded inwardly toward a central longitudinal axis of the tapered container at at least three circumferentially spaced regions to form fins that project outwardly from the central longitudinal axis, each fin having outer edges defined by one of said fold lines, the folded trailing end providing closure means for the container.

2. The container of claim 1 further comprising inner fold lines defining an inner edge of a fin defining surface portion, and whereby two adjacent fin defining surface portions form a fin.

3. The container of claim 2 wherein each pair of adjacent fin defining surface portions are secured to one another.

4. The container of claim 2 wherein the inner fold line comprises an oblique fold line interconnected at the forward end thereof with the outer fold line.

5. The container of claim 2 wherein the inner fold line comprises a longitudinal portion and an oblique portion interconnected at the forward end with the outer fold line.

6. The container of claim 1 having ballast means disposed at the forward end of the container.

7. The container of claim 1 further comprising a nose cap disposed at a forward portion of the container.

8. The container of claim 1 wherein the sheet material is biodegradable.

* * * * *